(12) United States Patent
Zeng

(10) Patent No.: US 9,817,180 B2
(45) Date of Patent: Nov. 14, 2017

(54) BACKLIGHT MODULE AND LIQUID CRYSTAL DISPLAY

(71) Applicant: Wuhan China Star Optoelectronics Technology Co., Ltd., Wuhan, Hubei (CN)

(72) Inventor: Jie Zeng, Guangdong (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 149 days.

(21) Appl. No.: 14/779,379

(22) PCT Filed: Jul. 16, 2015

(86) PCT No.: PCT/CN2015/084228
§ 371 (c)(1),
(2) Date: Sep. 23, 2015

(87) PCT Pub. No.: WO2016/206146
PCT Pub. Date: Dec. 29, 2016

(65) Prior Publication Data
US 2017/0139120 A1    May 18, 2017

(30) Foreign Application Priority Data
Jun. 26, 2015 (CN) .......................... 2015 1 0362281

(51) Int. Cl.
*F21V 8/00* (2006.01)

(52) U.S. Cl.
CPC ......... *G02B 6/0088* (2013.01); *G02B 6/0051* (2013.01); *G02B 6/0053* (2013.01); *G02B 6/0055* (2013.01)

(58) Field of Classification Search
CPC .. G02B 6/0088; G02B 6/0051; G02B 6/0053; G02B 6/0055
See application file for complete search history.

(56) References Cited

U.S. PATENT DOCUMENTS

2005/0128753 A1\* 6/2005 Kuo ..................... G02B 6/0031
                                                              362/301
2014/0016354 A1\* 1/2014 Lee ..................... G02B 6/0053
                                                              362/613

\* cited by examiner

*Primary Examiner* — Mary Ellen Bowman
(74) *Attorney, Agent, or Firm* — Andrew C. Cheng

(57) ABSTRACT

The present invention provides a backlight module, comprising an optical film assembly, a light guide plate, a reflector sheet, and the reflective sheet comprises a hollow display region, a side wall, a reflective region, and the display region is oppositely located to the reflective region, and the side wall is connected between the display region and the reflective region to form an accommodation space, and the light guide plate and the optical film assembly stack up together inside the accommodation space, and the light guide plate is located between the reflective region and the optical film assembly, and the optical film assembly is located between the light guide plate and the display region. By extending the reflective sheet into multiple regions, the reflective sheet can be bent to fix the light guide plate and the optical film assembly to eliminate the technical solution of the glue frame.

12 Claims, 2 Drawing Sheets

BACKLIGHT MODULE AND LIQUID CRYSTAL DISPLAY

CROSS REFERENCE

This application claims the priority of Chinese Patent Application No. 201510362281.X, entitled "Backlight module and liquid crystal display", filed on Jun. 26, 2015, the disclosure of which is incorporated herein by reference in its entirety.

FIELD OF THE INVENTION

The present invention relates to a liquid crystal display technology field, and more particularly to a backlight module and a liquid crystal display having the backlight module.

BACKGROUND OF THE INVENTION

With the constant development of the backlight display technology, the liquid crystal display devices, such as the Liquid Crystal Display (LCD) as being a display component has been widely utilized in the electronic products, such as the mobile phones, the digital camera, the Personal Digital Assistant (PDA). Along with that the frame of the electronic product becomes narrower and narrower, and the liquid crystal industry constantly progresses, the large scale LCD image display and the frame thinness have gradually become mainstream requirement of the market.

The backlight module is an important component in the liquid crystal display, and the frame design also became a tendency. The narrow frame means that the watched image area is larger and the visual effect is good in the screen of the same size. The present backlight module generally comprises: a light guide plate, a glue frame located around the light guide plate, a flexible printed circuit board, an optical film and a shading tape. The flexible printed circuit board is fixed on the light guide plate and the glue frame with the shading tape. The optical film is fixed on the glue frame with the shading tape.

Such kind of backlight module has problems as below:

The glue frame itself must have a certain thickness, which consequently increases the thickness of the backlight module, and thus, increases the entire thickness of the liquid crystal display. The mainstream of the market cannot be satisfied. Moreover, the components needed for the present backlight module are more, and the structure is complicated to increase the manufacture cost; besides, the assembly process of the glue frame and the light guide plate is more complicated, and the assembly efficiency is lower.

SUMMARY OF THE INVENTION

An objective of the present invention is to provide a backlight module, having advantages which the thickness of the backlight module is small and the assembly process is simple.

Another objective of the present invention is to provide a liquid crystal display utilizing the aforesaid backlight module.

For realizing the aforesaid objective, the technical solution provided by the embodiments of the present invention is:

the present invention discloses a backlight module, comprising an optical film assembly, a light guide plate, a reflector sheet, and the reflective sheet comprises a hollow display region, a side wall, a reflective region, and the display region is oppositely located to the reflective region, and the side wall is connected between the display region and the reflective region to form an accommodation space, and the light guide plate and the optical film assembly stack up together inside the accommodation space, and the light guide plate is located between the reflective region and the optical film assembly, and the optical film assembly is located between the light guide plate and the display region.

Fold lines are formed at a juncture of the display region and the side wall and at a juncture of the reflective region and the side wall for easily bending the reflective sheet.

The reflective sheet is a white reflective sheet or a silver reflective sheet, of which a reflective layer is coated on a surface thereof.

The optical film assembly comprises an upper brightness enhancement film, a lower brightness enhancement film and a diffuser, and the lower brightness enhancement film is located between the upper brightness enhancement film and the diffuser, and the diffuser is laminated on the light guide plate, and the upper brightness enhancement film is laminated with the display region.

The reflective sheet further comprises a junction part, and the junction part is at an arbitrary edge position of the reflective sheet, and the junction part is connected with a bottom of the reflective region after the reflective sheet surrounds to form the accommodation space.

The reflective sheet is connected with the junction part with a double-side tape or thermosetting adhesive.

The reflective sheet further comprises a junction part, and the junction part is at an arbitrary edge position of the reflective sheet, and the reflective sheet is connected with the junction part with a single-side tape to surround the accommodation space.

A portion of the single-side tape is adhered on the side wall, and the other portion is adhered on a bottom of the reflective region.

A portion of the single-side tape is adhered on the side wall, and the other portion is adhered on the display region.

The present invention further provides a liquid crystal display, comprising a backlight module, and the backlight module comprises an optical film assembly, a light guide plate, a reflector sheet, and the reflective sheet comprises a hollow display region, a side wall, a reflective region, and the display region is oppositely located to the reflective region, and the side wall is connected between the display region and the reflective region to form an accommodation space, and the light guide plate and the optical film assembly stack up together inside the accommodation space, and the light guide plate is located between the reflective region and the optical film assembly, and the optical film assembly is located between the light guide plate and the display region.

Fold lines are formed at a juncture of the display region and the side wall and at a juncture of the reflective region and the side wall for easily bending the reflective sheet.

The reflective sheet is a white reflective sheet or a silver reflective sheet, of which a reflective layer is coated on a surface thereof.

The optical film assembly comprises an upper brightness enhancement film, a lower brightness enhancement film and a diffuser, and the lower brightness enhancement film is located between the upper brightness enhancement film and the diffuser, and the diffuser is laminated on the light guide plate, and the upper brightness enhancement film is laminated with the display region.

The reflective sheet further comprises a junction part, and the junction part is at an arbitrary edge position of the reflective sheet, and the junction part is connected with a bottom of the reflective region after the reflective sheet surrounds to form the accommodation space.

The reflective sheet is connected with the junction part with a double-side tape or thermosetting adhesive.

The reflective sheet further comprises a junction part, and the junction part is at an arbitrary edge position of the reflective sheet, and the reflective sheet is connected with the junction part with a single-side tape to surround the accommodation space.

A portion of the single-side tape is adhered on the side wall, and the other portion is adhered on a bottom of the reflective region.

A portion of the single-side tape is adhered on the side wall, and the other portion is adhered on the display region.

The embodiments of the present invention have advantages or benefits:

In the backlight module of the present invention, with extending the reflective sheet into multiple regions, the reflective sheet can be bent to fix the light guide plate and the optical film assembly to eliminate the technical solution of the glue frame. The technical issue that the entire thickness of the backlight module is too thick is solved to achieve the skill result of diminishing the entire thickness of the backlight module and realizing the narrow frame design. Besides, the structure of the backlight module according to the present invention is simple. The manufacture cost is not only decreased but the assembly process of the entire backlight module also can be more convenient, which tremendously promote the assembly efficiency.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
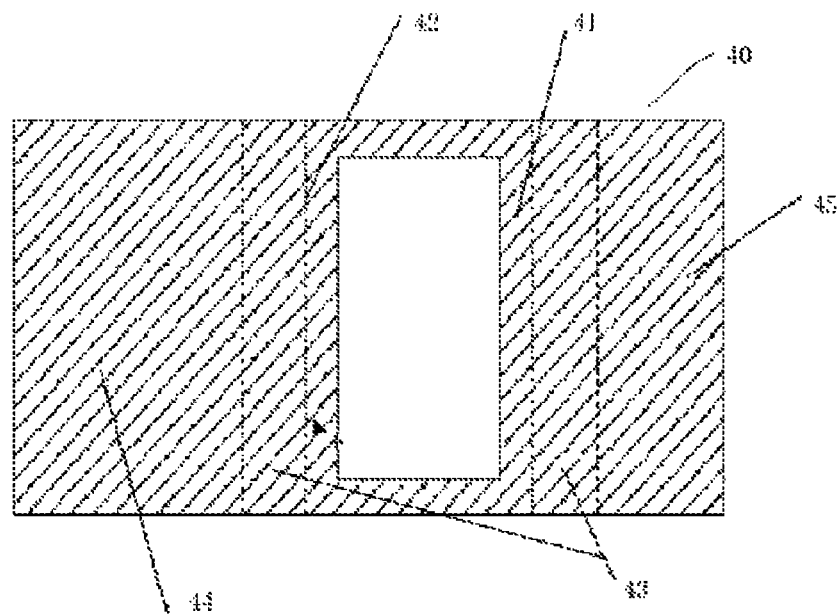
FIG. 1 is a structural diagram of a reflective sheet according to the embodiment of the present invention.
Figure 2:
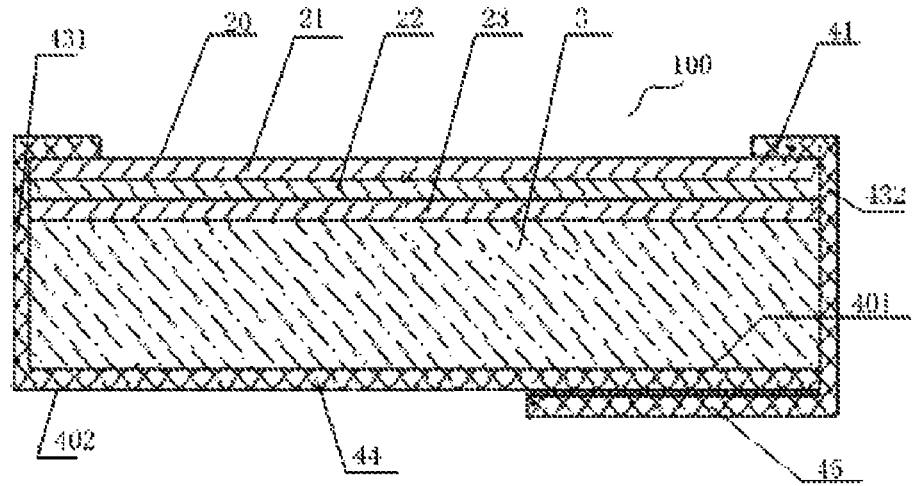
FIG. 2 is a sectional diagram of a part of the backlight module according to the first embodiment of the present invention.

Please refer to FIG. 1 and FIG. 2. As shown in FIG. 2, the backlight module 100 according to one embodiment of the present invention can be a liquid crystal backlight module, comprising an optical film assembly 20, a light guide plate 3 and a reflective sheet 40. As shown in FIG. 1, the reflective sheet 40 comprises a hollow display region 40, a side wall 43, a reflective region 44. The display region 41 is oppositely located to the reflective region 44, and the side wall 43 is connected between the display region 41 and the reflective region 44 to form an accommodation space, and the light guide plate 3 and the optical film assembly 20 stack up together inside the accommodation space, and the display region 41 is located above the optical film assembly 20 and covers the optical film assembly 20, and the optical film assembly 20 is right opposite to the hollow region of the display region to allow the light of the optical film assembly 20 passing through the hollow region, and the optical film assembly 20 is located on the light guide plate 3 for processing the light emitted from the light guide plate 3 to make the intensity of the light emitted from the backlight module 100 larger and the light more uniform, and the side wall 43 can be formed by extending downward from the display region 41, and the reflective region 44 is formed with one side wall extending to another side wall, and the light guide plate 3 is installed on the upper surface 401 of the reflective region 44. Preferably, the light guide plate 3 and the reflective region 44 are mutually aligned.

With extending the reflective sheet 40 into the display region 41, the side wall 43 and the reflective region 44, and bending the reflective sheet 40 to fix the light guide plate 3 and the optical film assembly 20, the glue frame can be eliminated. Thereby, the assembly gap existing in the assembly process of the backlight module 100 can be erased. Moreover, the entire thickness of the backlight module 100 is diminished to achieve the narrow frame design. Besides, the structure of the backlight module 100 according to the present invention is simple. The manufacture cost is not only decreased but the assembly process of the entire backlight module 100 also can be more convenient, which tremendously promote the assembly efficiency.

Furthermore, the side wall 43 is also constructed with the reflective sheet 40 to reflect the light leaked from the lateral sides of the light guide plate 3 and the optical film assembly 20 back into the backlight module 100. Therefore, the usage ratio of the light is raised and the display quality is promoted, accordingly.

Please refer to FIG. 1. The reflective sheet 40 is formed with fold lines 42, and the fold lines 42 are formed at a juncture of the display region 41 and the side wall 43 and at a juncture of the reflective region 44 and the side wall 43 for easily bending the reflective sheet.

In the embodiment of the present invention, the optical film 20 comprises an upper brightness enhancement film 21, a lower brightness enhancement film 22 and a diffuser 23. The upper brightness enhancement film 21, the lower brightness enhancement film 22 and the diffuser 23 are stack up from top to bottom in sequence. In other words, the lower brightness enhancement film 22 is located between the upper brightness enhancement film 21 and the diffuser 23. The diffuser 23 is laminated on the light guide plate 3, and the upper brightness enhancement film 21 is laminated with the display region 41.

Preferably, the reflective sheet 40 is a reflective sheet having high reflectivity, and employed to raise the face brightness of the backlight module 100 in a certain light source output. It is understandable that for preferably reducing the light leakage, the edge region of the light guide plate 3 is coated with a reflective coating layer (not shown) to prevent that the light leaks from the edge region of the light guide plate 3 and to promote the display result. In the embodiment of the present invention, the reflective sheet 40 is a white reflective sheet or a silver reflective sheet, of which a reflective layer is coated on a surface thereof. The material of the reflective layer can utilize the reflective material of which the reflectivity is above 50% to promote the reflective result.

Please refer to FIG. 1 and FIG. 2. In this embodiment, the reflective sheet 40 further comprises a junction part 45, and the junction part 45 is at an arbitrary edge of the reflective sheet 40. In one embodiment, the junction part 45 is at a bottom of the reflective region 44. The side wall 431 extends the reflective region 44 to another side wall 432. The side wall 432 extends the junction part 45 to the side wall 431. The junction part 45 is adhered on the bottom surface 402 of the reflective region with a double-side tape or thermosetting adhesive to connect the entire reflective sheet 40 to form an accommodation space.

Figure 3:
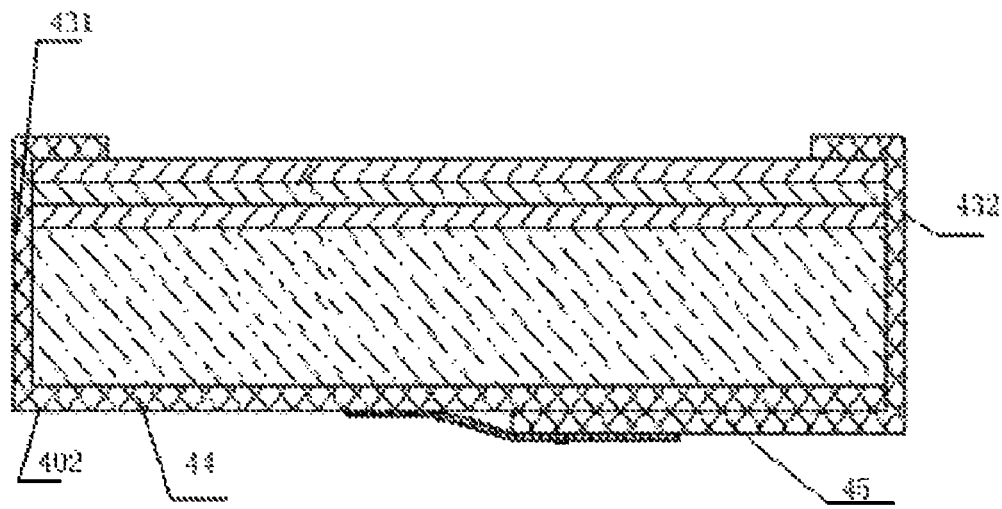
FIG. 3 is a sectional diagram of a part of the backlight module according to the second embodiment of the present invention.

Please refer to FIG. 3. In this embodiment, the junction part 45 also can be adhered on the bottom surface 402 of the reflective region 44 with a single-side tape. A portion of the single-side tape is adhered on the junction part 45, and the other portion is adhered on the bottom surface 402 of the reflective region 44.

Figure 4:
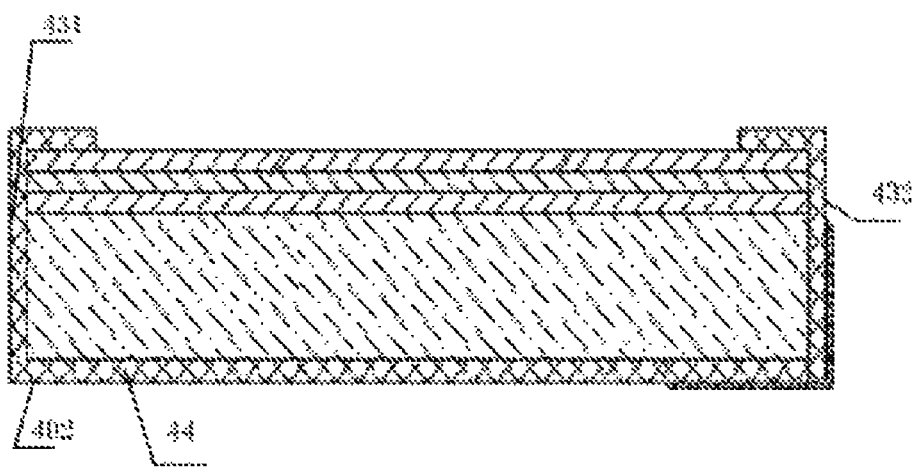
FIG. 4 is a sectional diagram of a part of the backlight module according to the third embodiment of the present invention.

In other embodiments, as shown in FIG. 4, the reflective region 44 is formed with the side wall 431 extending to another side wall 432. The reflective region 44 can be fixed at the side wall 432 with the single-side tape. A portion of the single-side tape is adhered on the side wall 432, and the other portion is adhered on the bottom surface 402 of the reflective region 44. In this embodiment, the junction part 45 is eliminated to decrease the thickness of the backlight module 100 in advance.

In other embodiments, the side wall can be formed by the reflective region 44 extending upward. The display region is formed with one side wall 431 extending to another side wall 432. The display region 41 can be fixed at the side wall 432 with the single-side tape. A portion of the single-side tape is adhered on the side wall 432, and the other portion is adhered on the display region 41. In this embodiment, the junction part 45 is eliminated to decrease the thickness of the backlight module 100 in advance.

Furthermore, the light guide plate 3 utilizes Polymethylmethacrylate (PMMA)/Polycarbonate (PC) to convert the line light source into the area light source.

Preferably, there should be seamless contacts between the light guide plate 3 and the reflective region 44, the optical film assembly 20. It cannot only reduce the entire thickness of the backlight module 100 but also promote the display quality.

It is understandable that in other embodiments of the present invention, the backlight module 100 can further comprise a light source (not shown). The light source can be located at one side of the light guide plate 3 to provide the backlight. The light emitted by the light source enters the light guide plate 3. Preferably, the light source can be a LED light source. The LED light source utilizes direct current power supply and has longer usage lifetime. In the specific transmission path of the light of the backlight module, after the light emitted from the backlight source enters the light guide plate 3, a portion of the light sequentially reaches the diffuser 23, the lower brightness enhancement film 22 and the upper brightness enhancement film 21, and ultimately is incident into the display panel. The other portion of the incident light is reflected by the reflective sheet 4. The reflected light sequentially reaches the diffuser 23, the lower brightness enhancement film 22 and the upper brightness enhancement film 21, and ultimately is incident into the display panel. It is understandable that the liquid crystal display and the backlight module 100 can be applied in any products or components having display function, such as the electronic paper, the liquid crystal TV, the mobile phone, the digital picture frame, the flat panel computer.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising an optical film assembly, a light guide plate, a reflector sheet, and the reflective sheet comprises a hollow display region, a side wall, a reflective region, and the display region is oppositely located to the reflective region, and the side wall is connected between the display region and the reflective region to form an accommodation space, and the light guide plate and the optical film assembly stack up together inside the accommodation space, and the light guide plate is located between the reflective region and the optical film assembly, and the optical film assembly is located between the light guide plate and the display region, wherein the reflective sheet further comprises a junction part, and the junction part is at an arbitrary edge position of the reflective sheet, and the reflective sheet is connected with the junction part with a single-side tape to surround the accommodation space.

2. The backlight module according to claim 1, wherein fold lines are formed at a juncture of the display region and the side wall and at a juncture of the reflective region and the side wall for easily bending the reflective sheet.

3. The backlight module according to claim 1, wherein the reflective sheet is a white reflective sheet or a silver reflective sheet, of which a reflective layer is coated on a surface thereof.

4. The backlight module according to claim 1, wherein the optical film assembly comprises an upper brightness enhancement film, a lower brightness enhancement film and a diffuser, and the lower brightness enhancement film is located between the upper brightness enhancement film and the diffuser, and the diffuser is laminated on the light guide plate, and the upper brightness enhancement film is laminated with the display region.

5. The backlight module according to claim 1, wherein a portion of the single-side tape is adhered on the side wall, and the other portion is adhered on a bottom of the reflective region.

6. The backlight module according to claim 1, wherein a portion of the single-side tape is adhered on the side wall, and the other portion is adhered on the display region.

7. A liquid crystal display, comprising a backlight module, and the backlight module comprises an optical film assembly, a light guide plate, a reflector sheet, and the reflective sheet comprises a hollow display region, a side wall, a reflective region, and the display region is oppositely located to the reflective region, and the side wall is connected between the display region and the reflective region to form an accommodation space, and the light guide plate and the optical film assembly stack up together inside the accommodation space, and the light guide plate is located between the reflective region and the optical film assembly, and the optical film assembly is located between the light guide plate and the display region, wherein the reflective sheet further comprises a junction part, and the junction part is at an arbitrary edge position of the reflective sheet, and the reflective sheet is connected with the junction part with a single-side tape to surround the accommodation space.

8. The liquid crystal display according to claim 7, wherein fold lines are formed at a juncture of the display region and the side wall and at a juncture of the reflective region and the side wall for easily bending the reflective sheet.

9. The liquid crystal display according to claim 7, wherein the reflective sheet is a white reflective sheet or a silver reflective sheet, of which a reflective layer is coated on a surface thereof.

10. The liquid crystal display according to claim 7, wherein the optical film assembly comprises an upper brightness enhancement film, a lower brightness enhancement film and a diffuser, and the lower brightness enhancement film is located between the upper brightness enhancement film and the diffuser, and the diffuser is laminated on the light guide plate, and the upper brightness enhancement film is laminated with the display region.

11. The liquid crystal display according to claim 7, wherein a portion of the single-side tape is adhered on the side wall, and the other portion is adhered on a bottom of the reflective region.

12. The liquid crystal display according to claim 7, wherein a portion of the single-side tape is adhered on the side wall, and the other portion is adhered on the display region.

* * * * *